US012469445B2

(12) United States Patent
Wang et al.

(10) Patent No.: US 12,469,445 B2
(45) Date of Patent: Nov. 11, 2025

(54) PIXEL CIRCUIT, DRIVING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Benlian Wang, Beijing (CN); Chengjie Qin, Beijing (CN); Cong Liu, Beijing (CN); Yu Wang, Beijing (CN); Weiyun Huang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/793,718

(22) PCT Filed: Sep. 18, 2021

(86) PCT No.: PCT/CN2021/119405
§ 371 (c)(1),
(2) Date: Jul. 19, 2022

(87) PCT Pub. No.: WO2023/039891
PCT Pub. Date: Mar. 23, 2023

(65) Prior Publication Data
US 2024/0221641 A1 Jul. 4, 2024

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01);
(Continued)

(58) Field of Classification Search
CPC ..... G09G 2300/0819; G09G 2310/062; G09G 2320/0257; G09G 2320/045; G09G 3/3233; G09G 3/3266
(Continued)

(56) References Cited

U.S. PATENT DOCUMENTS

2005/0017934 A1 1/2005 Chung et al.
2015/0364083 A1* 12/2015 Jeon .................... G09G 3/3233 345/76

(Continued)

FOREIGN PATENT DOCUMENTS

CN 100386794 C 5/2008
CN 106910468 A 6/2017

(Continued)

*Primary Examiner* — Mark Edwards
(74) *Attorney, Agent, or Firm* — IPro, PLLC

(57) ABSTRACT

The present disclosure provides a pixel circuit, a driving method and a display device. The pixel circuit includes a light-emitting element, a driving circuitry, a first resetting circuitry, a first control circuitry and a second control circuitry. The first resetting circuitry writes a first initial voltage into a first node under the control of a first scanning signal. The first control circuitry controls a power supply voltage end to be electrically coupled to a second node under the control of a second light-emission control signal. The second control circuitry controls a third node to be electrically coupled a first electrode of the light-emitting element under the control of a first light-emission control signal. The driving circuitry controls the second node to be electrically coupled to the third node under the control of a potential at the first node.

12 Claims, 5 Drawing Sheets

(52) U.S. Cl.
CPC ................. *G09G 2310/062* (2013.01); *G09G 2320/0257* (2013.01); *G09G 2320/045* (2013.01)

(58) Field of Classification Search
USPC ............................................................ 345/55
See application file for complete search history.

(56) References Cited

U.S. PATENT DOCUMENTS

| | | | | |
|---|---|---|---|---|
| 2016/0253958 | A1 | 9/2016 | Ma | |
| 2018/0047337 | A1 | 2/2018 | Zhu et al. | |
| 2019/0096327 | A1* | 3/2019 | Peng | G09G 3/3241 |
| 2021/0174743 | A1* | 6/2021 | Chang | G09G 3/3258 |
| 2022/0044627 | A1* | 2/2022 | Chen | G09G 3/3233 |
| 2022/0199010 | A1* | 6/2022 | Zhao | G09G 3/3225 |

FOREIGN PATENT DOCUMENTS

| | | | | | |
|---|---|---|---|---|---|
| CN | 111210776 | A | * | 5/2020 | G09G 3/3266 |
| CN | 111354308 | A | * | 6/2020 | |
| CN | 111383596 | A | * | 7/2020 | G09G 3/30 |
| CN | 111696486 | A | | 9/2020 | |
| CN | 112509515 | A | | 3/2021 | |
| CN | 113223458 | A | | 8/2021 | |

* cited by examiner

PIXEL CIRCUIT, DRIVING METHOD AND DISPLAY DEVICE

CROSS-REFERENCE TO RELATED APPLICATION

This application is the U.S. national phase of PCT Application No. PCT/CN2021/119405 filed on Sep. 18, 2021, which is incorporated herein by reference in its entirety.

TECHNICAL FIELD

The present disclosure relates to the field of display technology, in particular to a pixel circuit, a driving method and a display device.

BACKGROUND

In the related art, in a pixel driving circuitry, there is a parasitic capacitor between a gate electrode and a source electrode of a driving transistor. At a resetting phase, a voltage applied to the gate electrode of the driving transistor is initialized to an initial voltage, and under the effect of a coupling effect of the parasitic capacitor, a voltage applied to the source electrode of the driving transistor also changes. When different grayscales are reset at the resetting phase, changes in the voltage applied to the gate electrode of the driving transistor are different, so changes in the voltage applied to the source electrode of the driving transistor are also different, resulting in different voltages applied to the source electrode of the driving transistor and different gate-to-source voltages Vgs of the driving transistor after the resetting phase. In addition, a threshold voltage of the driving transistor is adversely affected by the gate-to-source voltage Vgs, so an afterimage occurs for a display panel.

SUMMARY

In one aspect, the present disclosure provides in some embodiments a pixel circuit, including a light-emitting element, a driving circuitry, a first resetting circuitry, a first control circuitry and a second control circuitry. The first resetting circuitry is coupled to a first scanning line, a first initial voltage end and a first node, and configured to write a first initial voltage provided by the first initial voltage end into the first node under the control of a first scanning signal provided by the first scanning line. The first control circuitry is electrically coupled to a second light-emission control line, a power supply voltage end and a second node, and configured to control the power supply voltage end to be electrically coupled to the second node under the control of a second light-emission control signal provided by the second light-emission control line. The second control circuitry is electrically coupled to a first light-emission control line, a third node and a first electrode of the light-emitting element, and configured to control the third node to be electrically coupled to the first electrode of the light-emitting element under the control of a first light-emission control signal provided by the first light-emission control line. A control end of the driving circuitry is electrically coupled to the first node, a first end of the driving circuitry is electrically coupled to the second node, a second end of the driving circuitry is electrically coupled to the third node, and the driving circuitry is configured to control the second node to be electrically coupled to the third node under the control of a potential at the first node. A second electrode of the light-emitting element is electrically coupled to a first voltage end.

In a possible embodiment of the present disclosure, the pixel circuit further includes a data writing circuitry and a threshold compensation circuitry. The threshold compensation circuitry is electrically coupled to a second scanning line, the first node and the third node, and configured to control the first node to be electrically coupled to the third node under the control of a second scanning signal provided by the second scanning line. The data writing circuitry is electrically coupled to a third scanning line, a data line and the second node, and configured to write a data voltage provided by the data line into the second node under the control of a third scanning signal provided by the third scanning line.

In a possible embodiment of the present disclosure, the pixel circuit further includes a second resetting circuitry electrically coupled to the second scanning line, a second initial voltage end and the first electrode of the light-emitting element, and configured to write a second initial voltage provided by the second initial voltage end into the first electrode of the light-emitting element under the control of the second scanning signal provided by the second scanning line.

In a possible embodiment of the present disclosure, the pixel circuit further includes a coupling circuitry, a first end of the coupling circuitry is electrically coupled to the first node, a second end of the coupling circuitry is electrically coupled to the power supply voltage end, and the coupling circuitry is configured to store electric energy and control the potential at the first node.

In a possible embodiment of the present disclosure, a transistor in the first light-emitting control circuitry and a transistor in the second light-emitting control circuitry are p-type transistors, the first light-emission control signal and the second light-emission control signal are provided by a same light-emission control signal generation circuitry, the first light-emission control signal is an $n^{th}$-level light-emission control signal provided by the light-emission control signal generation circuitry, and the second light-emission control signal is an $(n+1)^{th}$-level light-emission control signal provided by the light-emission control signal generation circuitry, where n is a positive integer.

In a possible embodiment of the present disclosure, a transistor in the first resetting circuitry, a transistor in the second resetting circuitry, a transistor in the data writing circuitry and a transistor in the threshold compensation circuitry are p-type transistors, the first scanning signal, the second scanning signal and the third scanning signal are provided by a same scanning signal generation circuitry, the first scanning signal is an $m^{th}$-level scanning signal provided by the scanning signal generation circuitry, the second scanning signal is an $(m+1)^{th}$-level scanning signal provided by the scanning signal generation circuitry, and the third scanning signal is an $(m+2)^{th}$-level scanning signal provided by the scanning signal generation circuitry, where m is a positive integer.

In a possible embodiment of the present disclosure, a transistor in the first resetting circuitry and a transistor in the threshold compensation circuitry are oxide transistors.

In a possible embodiment of the present disclosure, the first resetting circuitry includes a first transistor, a control electrode of the first transistor is electrically coupled to the first scanning line, a first electrode of the first transistor is electrically coupled to the first initial voltage end, and a second electrode of the first transistor is electrically coupled to the first node.

In a possible embodiment of the present disclosure, the first control circuitry includes a second transistor, and the second control circuitry includes a third transistor. A control electrode of the second transistor is electrically coupled to the second light-emission control line, a first electrode of the second transistor is electrically coupled to the power supply voltage end, and a second electrode of the second transistor is electrically coupled to the first node. A control electrode of the third transistor is electrically coupled to the first light-emission control line, a first electrode of the third transistor is electrically coupled to the third node, and a second electrode of the third transistor is electrically coupled to the first electrode of the light-emitting element.

In a possible embodiment of the present disclosure, the data writing circuitry includes a fourth transistor, and the threshold compensation circuitry includes a fifth transistor. A control electrode of the fourth transistor is electrically coupled to the third scanning line, a first electrode of the fourth transistor is electrically coupled to the data line, and a second electrode of the fourth transistor is electrically coupled to the second node. A control electrode of the fifth transistor is electrically coupled to the second scanning line, a first electrode of the fifth transistor is electrically coupled to the first node, and a second electrode of the fifth transistor is electrically coupled to the third node.

In a possible embodiment of the present disclosure, the second resetting circuitry includes a sixth transistor, a control electrode of the sixth transistor is electrically coupled to the second scanning line, a first electrode of the sixth transistor is electrically coupled to the second initial voltage end, and a second electrode of the sixth transistor is electrically coupled to the first electrode of the light-emitting element. The coupling circuitry includes a storage capacitor, a first end of the storage capacitor is electrically coupled to the first node, and a second end of the storage capacitor is electrically coupled to the power supply voltage end.

In a possible embodiment of the present disclosure, the driving circuitry includes a driving transistor, a control electrode of the driving transistor is electrically coupled to the first node, a first electrode of the driving transistor is electrically coupled to the second node, and a second electrode of the driving transistor is electrically coupled to the third node.

In another aspect, the present disclosure provides in some embodiments a driving method for the above-mentioned pixel circuit. A display period includes a resetting phase, and the driving method includes, at the resetting phase, writing, by the first resetting circuitry, the first initial voltage into the first node under the control of the first scanning signal, and controlling, by the first control circuitry, the power supply voltage end to be electrically coupled to the second node under the control of the second light-emission control signal.

In a possible embodiment of the present disclosure, the pixel circuit further includes a data writing circuitry, a threshold compensation circuitry, a second resetting circuitry and a coupling circuitry, and the display period further includes a data writing phase and a light-emitting phase after the resetting phase. The driving method further includes: at the data writing phase, writing, by the second resetting circuitry, the second initial voltage to the first electrode of the light-emitting element under the control of the second scanning signal such that the light-emitting element does not emit light, writing, by the data writing circuitry, the data voltage into the second node under the control of the third scanning signal, and controlling, by the threshold compensation circuitry, the first node to be electrically coupled to the third node under the control of the second scanning signal; at the beginning of the data writing phase, controlling, by the driving circuitry, the second node to be electrically coupled to the third node under the control of the potential at the first node to charge the coupling circuitry through a data voltage, so as to change the potential at the first node until the second node is electrically decoupled from the third node through the driving circuitry; and at the light-emitting phase, controlling, by the first control circuitry, the power supply voltage end to be electrically coupled to the second node under the control of the second light-emission control signal, controlling, by the second control circuitry, the third node to be electrically coupled to the first electrode of the light-emitting element under the control of the first light-emission control signal, and driving, by the driving circuitry, the light-emitting element to emit light.

In yet another aspect, the present disclosure provides in some embodiments a display device including the above-mentioned pixel circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
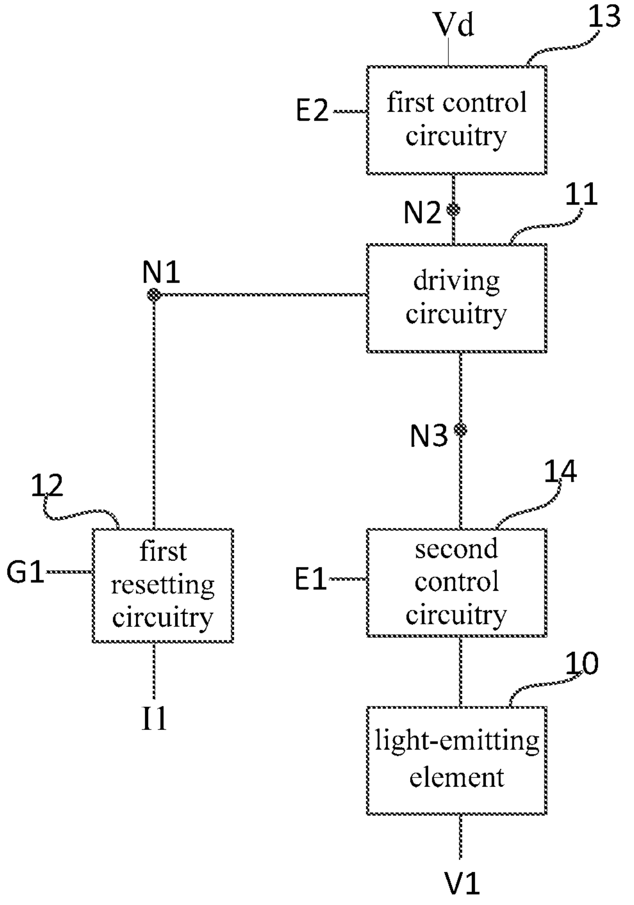
FIG. 1 is a schematic view showing a pixel circuit according to one embodiment of the present disclosure.

As shown in FIG. 1, the present disclosure provides in some embodiments a pixel circuit, which includes a light-emitting element 10, a driving circuitry 11, a first resetting circuitry 12, a first control circuitry 13, and a second control circuitry 14.

The first resetting circuitry 12 is coupled to a first scanning line G1, a first initial voltage end I1 and a first node N1, and configured to write a first initial voltage Vi1 provided by the first initial voltage end I1 into the first node N1 under the control of a first scanning signal provided by the first scanning line G1.

The first control circuitry 13 is electrically coupled to a second light-emission control line E2, a power supply voltage end Vd, and a second node N2, and configured to control the power supply voltage end Vd to be electrically coupled to the second node N2 under the control of a second light-emission control signal provided by the second light-emission control line E2. The power supply voltage end Vd is configured to provide a power supply voltage VDD.

The second control circuitry 14 is electrically coupled to a first light-emission control line E1, a third node N3 and a first electrode of the light-emitting element 10, and configured to control the third node N3 to be electrically coupled to the first electrode of the light-emitting element 10 under the control of a first light-emission control signal provided by the first light-emission control line E1.

A control end of the driving circuitry 11 is electrically coupled to the first node N1, a first end of the driving circuitry 11 is electrically coupled to the second node N2, a second end of the driving circuitry 11 is electrically coupled to the third node N3, and the driving circuitry 11 is configured to control the second node N2 to be electrically coupled to the third node N3 under the control of a potential at the first node N1.

A second electrode of the light-emitting element is electrically coupled to a first voltage end V1.

In the embodiments of the present disclosure, the first voltage end V1 may be, but not limited to, a low voltage end or a grounded end.

During the operation of the pixel circuit in FIG. 1, a display period includes a resetting phase before a data writing phase.

At the resetting phase, the first resetting circuitry 12 writes the first initial voltage Vi1 into the first node N1 under the control of the first scanning signal, and the first control circuitry 13 controls the power voltage end Vd to be electrically coupled to the second node N2 under the control of the second light-emission control signal.

According to the embodiments of the present disclosure, the pixel circuit includes the first resetting circuitry 12 and the first control circuitry 13, the first resetting circuitry 12 writes the first initial voltage Vi1 into the control end of the driving circuitry 11 before a data voltage has been written into the first end of the driving circuitry 11, and the first control circuitry 14 writes the power supply voltage VDD into the first end of the driving circuitry 11 under the control of the second light-emission control signal to provide a bias voltage to a driving transistor in the driving circuitry 11. As a result, it is able to maintain the driving transistor in a resetting state, and improve a hysteresis of the driving transistor, thereby to eliminate afterimages.

During the implementation, due to the hysteresis of the driving transistor, a response speed of the driving transistor is low. In the embodiments of the present disclosure, a gate-to-source voltage of the driving transistor is quickly reset before the data voltage has been written, so as to improve the hysteresis of the driving transistor and increase a hysteresis recovery speed.

Furthermore, in the embodiments of the present disclosure, the first control circuitry 13 is electrically coupled to the second light-emission control line E2, and it operates under the control of the second light-emission control signal provided by the second light-emission control line E2. The second control circuitry 14 is electrically coupled to the first light-emission control line E1, and it operates under the control of the first light-emission control signal provided by the first light-emission control line E1. In this way, it is able to ensure a normal timing sequence at a light-emitting phase, thereby to ensure a display effect.

Figure 2:
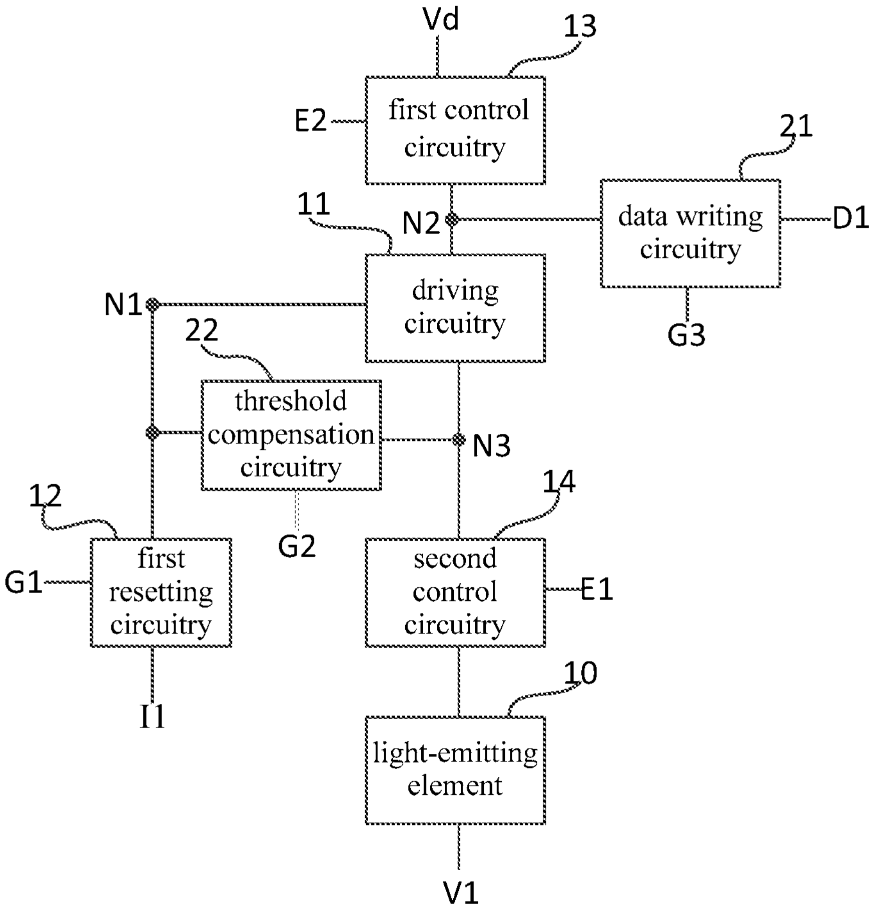
FIG. 2 is a schematic view showing the pixel circuit according to one embodiment of the present disclosure.

As shown in FIG. 2, on the basis of the pixel circuit in FIG. 1, the pixel circuit further includes a data writing circuitry 21 and a threshold compensation circuitry 22.

The threshold compensation circuitry 22 is electrically coupled to a second scanning line G2, the first node N1 and the third node N3, and configured to control the first node N1 to be electrically coupled to the third node N3 under the control of a second scanning signal provided by the second scanning line G2.

The data writing circuitry 21 is electrically coupled to a third scanning line G3, a data line D1 and the second node N2, and configured to write a data voltage Vdata provided by the data line D1 into the second node N2 under the control of a third scanning signal provided by the third scanning line G3.

In the pixel circuit as shown in FIG. 2, the first resetting circuitry 12 is electrically coupled to the first scanning line G1, and it operates under the control of the first scanning signal. The threshold compensation circuitry 22 is electrically coupled to the second scanning line G2, and it operates under the control of the second scanning signal. The data writing circuitry 21 is electrically coupled to the third scanning line G3, and it operates under the control of the third scanning signal. Through the cooperation of the scanning signals, it is able to perform the initialization and data writing normally, thereby to ensure an initialization effect and a threshold voltage compensation effect.

In the embodiments of the present disclosure, the pixel circuit further includes a second resetting circuitry electrically coupled to the second scanning line, a second initial voltage end and the first electrode of the light-emitting element, and configured to write a second initial voltage provided by the second initial voltage end into the first electrode of the light-emitting element under the control of the second scanning signal provided by the second scanning line, so as to control the light-emitting element not to emit light, and remove residual charges on the first electrode of the light-emitting element.

In the embodiments of the present disclosure, the pixel circuit further includes a coupling circuitry, a first end of the coupling circuitry is electrically coupled to the first node, a second end of the coupling circuitry is electrically coupled to the power supply voltage end, and the coupling circuitry is configured to store electric energy and control the potential at the first node.

Figure 3:
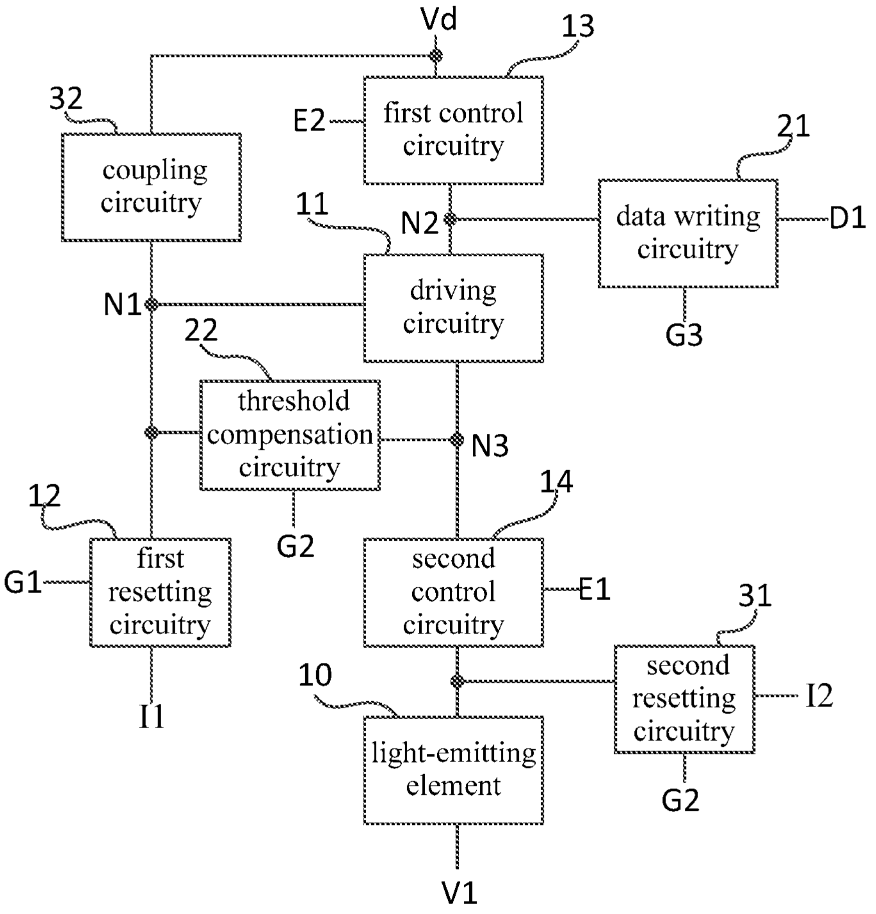
FIG. 3 is another schematic view showing the pixel circuit according to one embodiment of the present disclosure.

As shown in FIG. 3, on the basis of the pixel circuit o in FIG. 2, the pixel circuit further includes a second resetting circuitry 31 and a coupling circuitry 32.

The second resetting circuitry 31 is electrically coupled to the second scanning line G2, the second initial voltage end 12 and the first electrode of the light-emitting element 10, and configured to write the second initial voltage Vi2 provided by the second initial voltage end 12 into the first electrode of the light-emitting element 10 under the control of the second scanning signal provided by the second scanning line G2.

A first end of the coupling circuitry 32 is electrically coupled to the first node N1, a second end of the coupling circuitry 32 is electrically coupled to the power voltage end Vd, and the coupling circuitry 32 is configured to store electric energy and control the potential at the first node N1.

During the operation of the pixel circuit in FIG. 3, the display period further includes a data writing phase and a light-emitting phase after the resetting phase.

At the data writing phase, the second resetting circuitry 31 writes the second initial voltage Vi2 into the first electrode of the light-emitting element 10 under the control of the second scanning signal such that the light-emitting element 10 does not emit light, the data writing circuitry 21 writes the data voltage Vdata into the second node N2 under the control of the third scanning signal, and the threshold compensation circuitry 22 controls the first node N1 to be electrically coupled to the third node N3 under the control of the second scanning signal.

At the beginning of the data writing phase, the driving circuitry 11 controls the second node N2 to be electrically coupled to the third node N3 under the control of the potential at the first node N1 to charge the coupling circuitry 32 through the data voltage Vdata, so as to change the potential at the first node N1 until the second node N2 is electrically decoupled from the third node N3 through the driving circuitry 11. At this time, the potential at N1 is Vdata+Vth, where Vth is a threshold voltage of the driving transistor in the driving circuitry 11.

At the light-emitting phase, the first control circuitry 13 controls the power supply voltage end Vd to be electrically coupled to the second node N2 under the control of the second light-emission control signal, the second control circuitry 14 controls the third node N3 to be electrically coupled to the first electrode of the light-emitting element 10 under the control of the first light-emission control signal, and the driving circuitry 11 drives the light-emitting element 10 to emit light.

In a possible embodiment of the present disclosure, a transistor in the first light-emitting control circuitry and a transistor in the second light-emitting control circuitry are p-type transistors. The first light-emission control signal and the second light-emission control signal are provided by a same light-emission control signal generation circuitry. The first light-emission control signal is an $n^{th}$-level light-emission control signal provided by the light-emission control signal generation circuitry, and the second light-emission control signal is an $(n+1)^{th}$-level light-emission control signal provided by the light-emission control signal generation circuitry, where n is a positive integer.

During the implementation, the first light-emission control signal and the second light-emission control signal are two adjacent levels of light-emission control signals provided by a same light-emission control signal generation circuitry.

In a possible embodiment of the present disclosure, a transistor in the first resetting circuitry, a transistor in the second resetting circuitry, a transistor in the data writing circuitry, and a transistor in the threshold compensation circuitry are all p-type transistors. The first scanning signal, the second scanning signal, and the third scanning signal are provided by a same scanning signal generation circuitry. The first scanning signal is an $m^{th}$-level scanning signal provided by the scanning signal generation circuitry, the second scanning signal is an $(m+1)^{th}$-level scanning signal provided by the scanning signal generation circuitry, and the third scanning signal is an $(m+2)^{th}$-level scanning signal provided by the scanning signal generation circuitry, where m is a positive integer.

During the implementation, the first scanning signal, the second scanning signal and the third scanning signal are three adjacent levels of scanning signals provided by a same scanning signal generation circuitry.

In the embodiments of the present disclosure, a transistor in the first resetting circuitry and a transistor in the threshold compensation circuitry are oxide transistors.

Oxide transistors have a low leakage current and low mobility. In the embodiments of the present disclosure, when the transistor in the first resetting circuitry and the transistors in the threshold compensation circuitry are oxide thin film transistors, it is able to achieve a low leakage current, thereby to ensure the stability of a potential at the control end of the driving circuitry. However, the present disclosure is not limited thereto.

In a possible embodiment of the present disclosure, the first resetting circuitry includes a first transistor, a control electrode of the first transistor is electrically coupled to the first scanning line, a first electrode of the first transistor is electrically coupled to the first initial voltage end, and a second electrode of the first transistor is electrically coupled to the first node.

In a possible embodiment of the present disclosure, the first control circuitry includes a second transistor, and the second control circuitry includes a third transistor.

A control electrode of the second transistor is electrically coupled to the second light-emission control line, a first electrode of the second transistor is electrically coupled to the power supply voltage end, and a second electrode of the second transistor is electrically coupled to the first node.

A control electrode of the third transistor is electrically coupled to the first light-emission control line, a first electrode of the third transistor is electrically coupled to the third node, and a second electrode of the third transistor is electrically coupled to the first electrode of the light-emitting element.

In a possible embodiment of the present disclosure, the data writing circuitry includes a fourth transistor, and the threshold compensation circuitry includes a fifth transistor.

A control electrode of the fourth transistor is electrically coupled to the third scanning line, a first electrode of the fourth transistor is electrically coupled to the data line, and a second electrode of the fourth transistor is electrically coupled to the second node.

A control electrode of the fifth transistor is electrically coupled to the second scanning line, a first electrode of the fifth transistor is electrically coupled to the first node, and a second electrode of the fifth transistor is electrically coupled to the third node.

In a possible embodiment of the present disclosure, the second resetting circuitry includes a sixth transistor, a control electrode of the sixth transistor is electrically coupled to the second scanning line, a first electrode of the sixth transistor is electrically coupled to the second initial voltage end, and a second electrode of the sixth transistor is electrically coupled to a first electrode of the light-emitting element.

The coupling circuitry includes a storage capacitor, a first end of the storage capacitor is electrically coupled to the first node, and a second end of the storage capacitor is electrically coupled to the power supply voltage end.

In a possible embodiment of the present disclosure, the driving circuitry includes a driving transistor, a control electrode of the driving transistor is electrically coupled to the first node, a first electrode of the driving transistor is electrically coupled to the second node, and a second electrode of the driving transistor is electrically coupled to the third node.

Figure 4:
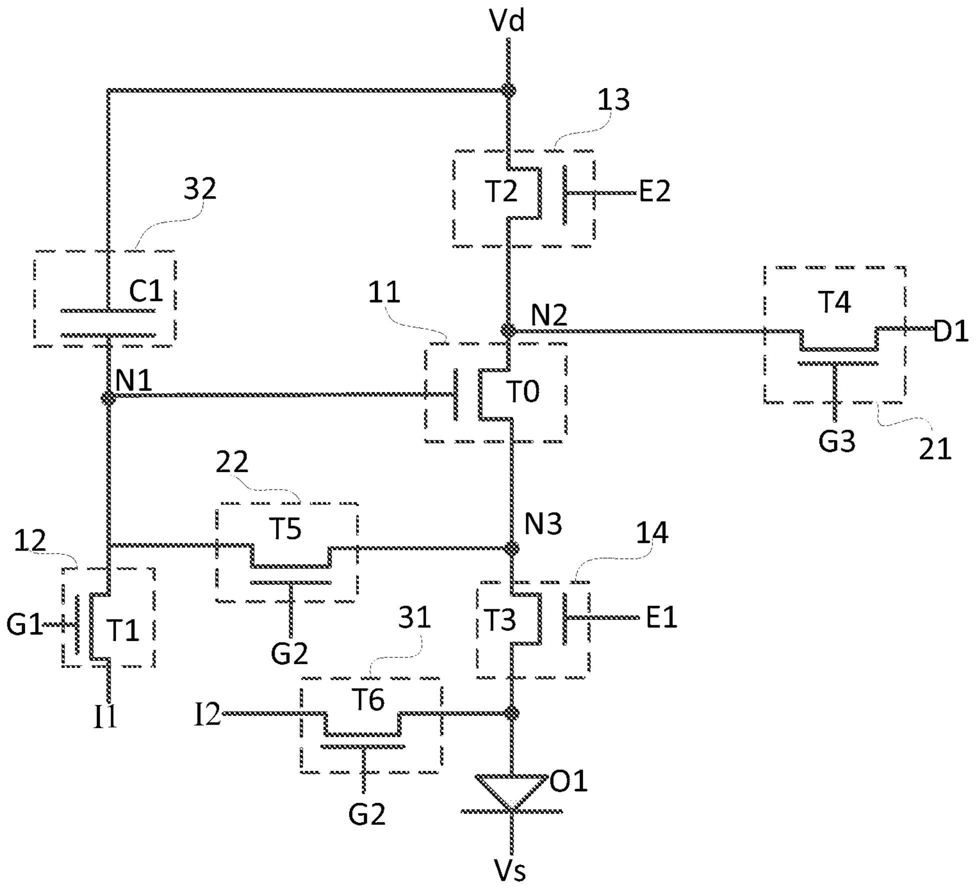
FIG. 4 is a circuit diagram of the pixel circuit according to one embodiment of the present disclosure.

As shown in FIG. 4, on the basis of the pixel circuit in FIG. 3, the light-emitting element is an organic light-emitting diode O1, and the first resetting circuitry 12 includes a first transistor T1. A gate electrode of the first transistor T1 is electrically coupled to the first scanning line G1, a source electrode of the first transistor T1 is electrically coupled to the first initial voltage end I1, and a drain electrode of the first transistor T1 is electrically coupled to the first node N1.

The first control circuitry 13 includes a second transistor T2, and the second control circuitry 14 includes a third transistor T3.

A gate electrode of the second transistor T2 is electrically coupled to the second light-emission control line E2, a source electrode of the second transistor T2 is electrically coupled to the power supply voltage end Vd, and a drain electrode of the second transistor T2 is electrically coupled to the first node N1. The power supply voltage end is configured to provide a power supply voltage VDD.

A gate electrode of the third transistor T3 is electrically coupled to the first light-emission control line E1, A source electrode of the third transistor T3 is electrically coupled to the third node N3, and a drain electrode of the third transistor T3 is electrically coupled to an anode of O1. A cathode of O1 is electrically coupled to a low voltage end Vs which is configured to provide a low voltage VSS.

The data writing circuitry 21 includes a fourth transistor T4, and the threshold compensation circuitry 22 includes a fifth transistor T5.

A gate electrode of the fourth transistor T4 is electrically coupled to the third scanning line G3, a source electrode of the fourth transistor T4 is electrically coupled to the data line D1, and a drain electrode of the fourth transistor T4 is electrically coupled to the second node N2.

A gate electrode of the fifth transistor T5 is electrically coupled to the second scanning line G2, a source electrode of the fifth transistor T5 is electrically coupled to the first node N1, and the second electrode of the fifth transistor T5 is electrically coupled to the third node.

The second resetting circuitry 31 includes a sixth transistor T6. A gate electrode of the sixth transistor T6 is electrically coupled to the second scanning line G2, a source electrode of the sixth transistor T6 is electrically coupled to the second initial voltage end 12, and a drain electrode of the sixth transistor T6 is electrically coupled to the anode of O1.

The coupling circuitry 32 includes a storage capacitor C1. A first end of the storage capacitor C1 is electrically coupled to the first node N1, and a second end of the storage capacitor C1 is electrically coupled to the power supply voltage end Vd.

The driving circuitry 11 includes a driving transistor T0. A gate electrode of the driving transistor T0 is electrically coupled to the first node N1, a source electrode of the driving transistor T0 is electrically coupled to the second node N2, and a drain electrode of the driving transistor T0 is electrically coupled to the third node N3.

In the pixel circuit as shown in FIG. 4, all the transistors are p-type transistors, and all the transistors may be, but not limited to, low temperature polysilicon transistors.

In the pixel circuit as shown in FIG. 4, T2 and T3 respond to different light-emission control signals, and T1, T5 and T4 respond to different scanning signals, so as to ensure that initialization, the data writing, the threshold compensation and the light emission of the OLED are performed normally, thereby to ensure the threshold voltage compensation effect and the display effect.

Figure 5:
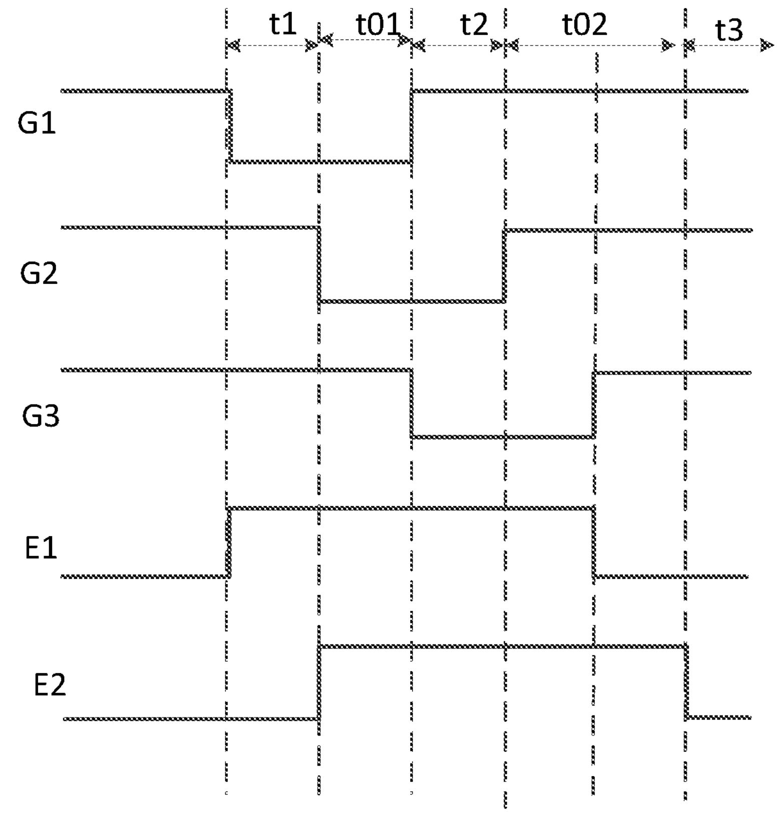
FIG. 5 is a sequence diagram of the pixel circuit in FIG. 4.

As shown in FIG. 5, during the operation of the pixel circuit in FIG. 4, the display period includes an initialization phase t1, a data writing phase t2 and a light-emitting phase t3 which are arranged successively.

At the initialization phase t1, G1 and E2 provide low voltage signals, and G2, G3 and E1 provide high voltage signals, so as to turn on T1 and T2 to write Vi1 into N1 and write VDD into N2, thereby to reset a gate-to-source voltage of T0, i.e., to enable T0 to be in a biased state. In this way, it is able to improve a hysteresis effect of T0, thereby to eliminate the afterimage.

At the data writing phase t2, G1 provides a high voltage signal, G2 and G3 provide low voltage signals, E1 and E2 provide high voltage signals, and D1 provides a data voltage Vdata, so as to turn on T5, T4 and T6, thereby to write the data voltage Vdata into N2, control N1 to be electrically coupled to N3, and write Vi2 into the anode of O1. At this time, O1 does not emit light, and residual charges on the anode of O1 are removed.

At the beginning of the data writing phase t2, T0 is turned on to charge C1 through Vdata, so as to pull up the potential at N1 until the potential at N1 is changed to Vdata+Vth, and turn off T0, where Vth is a threshold voltage of T0.

At the light-emitting phase t3, G1, G2 and G3 provide high voltage signals, and E1 and E2 provide low voltage signals, so as to turn on T2 and T3. At this time, T0 drives O1 to emit light.

As shown in FIG. 5, the first scanning signal provided by G1, the second scanning signal provided by G2 and the third scanning signal provided by G3 are three adjacent levels of scanning signals provided by a same scanning signal generation circuitry, and the first light-emission control signal provided by E1 and the second light-emission control signal provided by E2 are two adjacent levels of light-emission control signals provided by a same light-emission control signal generation circuitry. In this way, it is able to reduce the quantity of scanning signal generation circuitries adopted by the display device as well as the quantity of light-emission control signal generation circuitries adopted by the display device, thereby to simplify the structure and reduce the manufacture cost.

In FIG. 5, a first time period t01 between t1 and t2 and a second time period t02 between t2 and t3 are redundant time sequences for ensuring that G1, G2 and G3 share a same scanning signal generation circuitry and E1 and E2 share a same light-emission control signal generation circuitry.

As shown in FIGS. 4 and 5, in the embodiments of the present disclosure, the driving transistor T0 needs to be turned on at the data writing phase, so a voltage difference Vi1-VDD between the first initial voltage Vi1 and the power supply voltage VDD needs to be smaller than the threshold voltage Vth of T0. An absolute value of VDD is greater than 1.5 times, e.g., 1.6 times, 1.8 times or twice, of an absolute value of Vth, so as to achieve a bias effect rapidly within a short time period.

In a possible embodiment of the present disclosure, a voltage value of Vi1 is greater than or equal to −4 V and less than or equal to −2 V, a voltage value of VDD is greater than or equal to 4 V and less than or equal to 5.5 V, and a voltage value of Vth is greater than or equal to −3.5 V and less than or equal to −2 V.

In the embodiments of the present disclosure, the voltage value of Vi2 is greater than or equal to −4 V and less than or equal to −2 V.

The present disclosure further provides in some embodiments a driving method for the above-mentioned pixel circuit. A display period includes a resetting phase, and the driving method includes, at the resetting phase, writing, by the first resetting circuitry, the first initial voltage into the first node under the control of the first scanning signal, and controlling, by the first control circuitry, the power supply voltage end to be electrically coupled to the second node under the control of the second light-emission control signal.

According to the driving method in the embodiments of the present disclosure, before the data voltage has been written into the first end of the driving circuitry, at the initialization phase, the first resetting circuitry writes the first initial voltage into the control end of the driving circuitry, and the first control circuitry, under the control of the second light-emission control signal, writes the power supply voltage into the first end of the driving circuitry to provide a bias voltage to the driving transistor in the driving circuitry 11. As a result, it is able to maintain the driving transistor in a resetting state and improve a hysteresis of the driving transistor, thereby to eliminate the afterimages.

In the embodiments of the present disclosure, the pixel circuit further includes a data writing circuitry, a threshold compensation circuitry, a second resetting circuitry and a coupling circuitry, and the display period further includes a data writing phase and a light-emitting phase after the resetting phase. The driving method further includes: at the data writing phase, writing, by the second resetting circuitry, the second initial voltage to the first electrode of the light-emitting element under the control of the second scanning signal such that the light-emitting element does not emit light, writing, by the data writing circuitry, the data voltage into the second node under the control of the third scanning signal, and controlling, by the threshold compensation circuitry, the first node to be electrically coupled to the third node under the control of the second scanning signal; at the beginning of the data writing phase, controlling, by the driving circuitry, the second node to be electrically coupled to the third node under the control of the potential at the first node to charge the coupling circuitry through a data voltage, so as to change the potential at the first node until the second node is electrically decoupled from the third node through the driving circuitry; and at the light-emitting phase, controlling, by the first control circuitry, the power supply voltage end to be electrically coupled to the second node under the control of the second light-emission control signal, controlling, by the second control circuitry, the third node to be electrically coupled to the first electrode of the light-emitting element under the control of the first light-emission control signal, and driving, by the driving circuitry, the light-emitting element to emit light.

The present disclosure further provides in some embodiments a display device which includes the above-mentioned pixel circuit.

The display device may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a light-emitting element, a driving circuitry, a first resetting circuitry, a first control circuitry and a second control circuitry, wherein the first resetting circuitry is coupled to a first scanning line, a first initial voltage end and a first node, and configured to write a first initial voltage provided by the first initial voltage end into the first node under the control of a first scanning signal provided by the first scanning line;

the first control circuitry is electrically coupled to a second light-emission control line, a power supply voltage end and a second node, and configured to control the power supply voltage end to be electrically coupled to the second node under the control of a second light-emission control signal provided by the second light-emission control line;

the second control circuitry is electrically coupled to a first light-emission control line, a third node and a first electrode of the light-emitting element, and configured to control the third node to be electrically coupled to the first electrode of the light-emitting element under the control of a first light-emission control signal provided by the first light-emission control line;

a control end of the driving circuitry is electrically coupled to the first node, a first end of the driving circuitry is electrically coupled to the second node, a second end of the driving circuitry is electrically coupled to the third node, and the driving circuitry is configured to control the second node to be electrically coupled to the third node under the control of a potential at the first node; and a second electrode of the light-emitting element is electrically coupled to a first voltage end;

wherein the first light-emission control signal and the second light-emission control signal are different light-emission control signals;

wherein the driving circuitry comprises a driving transistor, a voltage difference between the first initial voltage and a power supply voltage is smaller than a threshold voltage of the driving transistor;

wherein an absolute value of the power supply voltage is greater than 1.5 times of an absolute value of the threshold voltage;

wherein the pixel circuit further comprises a data writing circuitry and a threshold compensation circuitry, wherein the threshold compensation circuitry is electrically coupled to a second scanning line, the first node and the third node, and configured to control the first node to be electrically coupled to the third node under the control of a second scanning signal provided by the second scanning line; and the data writing circuitry is electrically coupled to a third scanning line, a data line and the second node, and configured to write a data voltage provided by the data line into the second node under the control of a third scanning signal provided by the third scanning line;

wherein the pixel circuit further comprises a second resetting circuitry electrically coupled to the second scanning line, a second initial voltage end and the first electrode of the light-emitting element, and configured to write a second initial voltage provided by the second initial voltage end into the first electrode of the light-emitting element;

wherein a transistor in the first resetting circuitry, a transistor in the second resetting circuitry, a transistor in the data writing circuitry and a transistor in the threshold compensation circuitry are p-type transistors, the first scanning signal, the second scanning signal and the third scanning signal are provided by a same scanning signal generation circuitry, the first scanning signal is an $m^{th}$-level scanning signal provided by the scanning signal generation circuitry, the second scanning signal is an $(m+1)^{th}$-level scanning signal provided by the scanning signal generation circuitry, and the third scanning signal is an $(m+2)^{th}$-level scanning signal provided by the scanning signal generation circuitry, where m is a positive integer.

2. The pixel circuit according to claim 1, further comprising a coupling circuitry, a first end of the coupling circuitry is electrically coupled to the first node, a second end of the coupling circuitry is electrically coupled to the power supply voltage end, and the coupling circuitry is configured to store electric energy and control the potential at the first node.

3. The pixel circuit according to claim 1, wherein a transistor in the first light-emitting control circuitry and a transistor in the second light-emitting control circuitry are p-type transistors, the first light-emission control signal and the second light-emission control signal are provided by a same light-emission control signal generation circuitry, the first light-emission control signal is an $n^{th}$-level light-emission control signal provided by the light-emission control signal generation circuitry, and the second light-emission control signal is an $(n+1)^{th}$-level light-emission control signal provided by the light-emission control signal generation circuitry, where n is a positive integer.

4. The pixel circuit according to claim 1, wherein a transistor in the first resetting circuitry and a transistor in the threshold compensation circuitry are oxide transistors.

5. The pixel circuit according to claim 1, wherein the first resetting circuitry comprises a first transistor, a control electrode of the first transistor is electrically coupled to the first scanning line, a first electrode of the first transistor is electrically coupled to the first initial voltage end, and a second electrode of the first transistor is electrically coupled to the first node.

6. The pixel circuit according to claim 1, wherein the first control circuitry comprises a second transistor, and the second control circuitry comprises a third transistor; a control electrode of the second transistor is electrically coupled to the second light-emission control line, a first electrode of the second transistor is electrically coupled to the power supply voltage end, and a second electrode of the second transistor is electrically coupled to the second node; and a control electrode of the third transistor is electrically coupled to the first light-emission control line, a first electrode of the third transistor is electrically coupled to the third node, and a second electrode of the third transistor is electrically coupled to the first electrode of the light-emitting element.

7. The pixel circuit according to claim 1, wherein the data writing circuitry comprises a fourth transistor, and the threshold compensation circuitry comprises a fifth transistor; a control electrode of the fourth transistor is electrically coupled to the third scanning line, a first electrode of the fourth transistor is electrically coupled to the data line, and a second electrode of the fourth transistor is electrically coupled to the second node; and a control electrode of the fifth transistor is electrically coupled to the second scanning line, a first electrode of the fifth transistor is electrically coupled to the first node, and a second electrode of the fifth transistor is electrically coupled to the third node.

8. The pixel circuit according to claim 1, wherein the second resetting circuitry comprises a sixth transistor, a control electrode of the sixth transistor is electrically coupled to the second scanning line, a first electrode of the sixth transistor is electrically coupled to the second initial voltage end, and a second electrode of the sixth transistor is electrically coupled to the first electrode of the light-emitting element; and the coupling circuitry comprises a storage capacitor, a first end of the storage capacitor is electrically coupled to the first node, and a second end of the storage capacitor is electrically coupled to the power supply voltage end.

9. The pixel circuit according to claim 1, wherein the driving circuitry comprises a driving transistor, a control electrode of the driving transistor is electrically coupled to the first node, a first electrode of the driving transistor is electrically coupled to the second node, and a second electrode of the driving transistor is electrically coupled to the third node.

10. A driving method for the pixel circuit according to claim 1, wherein a display period comprises a resetting phase, and the display method comprises, at the resetting phase, writing, by the first resetting circuitry, the first initial voltage into the first node under the control of the first scanning signal, and controlling, by the first control circuitry, the power supply voltage end to be electrically coupled to the second node under the control of the second light-emission control signal.

11. The driving method according to claim 10, wherein the pixel circuit further comprises a data writing circuitry, a threshold compensation circuitry, a second resetting circuitry and a coupling circuitry, and the display period further comprises a data writing phase and a light-emitting phase after the resetting phase, wherein the driving method further comprises:

at the data writing phase, writing, by the second resetting circuitry, the second initial voltage to the first electrode of the light-emitting element under the control of the second scanning signal such that the light-emitting element does not emit light, writing, by the data writing circuitry, the data voltage into the second node under the control of the third scanning signal, and controlling, by the threshold compensation circuitry, the first node to be electrically coupled to the third node under the control of the second scanning signal;

at the beginning of the data writing phase, controlling, by the driving circuitry, the second node to be electrically coupled to the third node under the control of the potential at the first node to charge the coupling circuitry through a data voltage, so as to change the potential at the first node until the second node is electrically decoupled from the third node through the driving circuitry; and at the light-emitting phase, controlling, by the first control circuitry, the power supply voltage end to be electrically coupled to the second node under the control of the second light-emission control signal, controlling, by the second control circuitry, the third node to be electrically coupled to the first electrode of the light-emitting element under the control of the first light-emission control signal, and driving, by the driving circuitry, the light-emitting element to emit light;

wherein the display period further comprises a first time period between the initialization phase and the data writing phase and a second time period between the data writing phase and the light-emitting phase, wherein the first time period and the second time period are redundant time sequences, configured to ensure that the first scanning line, the second scanning line and the third scanning line share a same scanning signal generation circuitry and the first light-emission control line and the second light-emission control line share a same light-emission control signal generation circuitry.

12. A display device, comprising the pixel circuit according to claim 1.

* * * * *